United States Patent [19]
Sims et al.

[11] Patent Number: 5,354,032
[45] Date of Patent: Oct. 11, 1994

[54] SYSTEM FOR CONTROLLING FLUID FLOW

[75] Inventors: Charles R. Sims, Royston; Victor C. Humberstone; Adrian M. Woodward, both of Cambridge, all of United Kingdom

[73] Assignee: The Technology Partnership Ltd., United Kingdom

[21] Appl. No.: 965,337

[22] Filed: Oct. 23, 1992

[30] Foreign Application Priority Data

Oct. 25, 1991 [GB] United Kingdom ............... 9122739

[51] Int. Cl.⁵ ............................................ F16K 31/02
[52] U.S. Cl. ........................ 251/129.06; 251/129.04
[58] Field of Search .............. 251/129.06, 129.04, 251/129.01

[56] References Cited
U.S. PATENT DOCUMENTS

| | | | |
|---|---|---|---|
| 3,360,664 | 10/1964 | Straube | 310/8.2 |
| 3,414,010 | 12/1968 | Sparrow | 251/129.06 |
| 3,752,189 | 8/1973 | Marr | 251/129.04 |
| 4,545,561 | 10/1985 | Brown | 251/129.08 |
| 4,610,426 | 2/1986 | Brandner | 251/129.06 |
| 4,617,952 | 10/1986 | Fujiwara et al. | 251/129.06 |
| 4,934,401 | 6/1990 | Ikehata | 251/129.06 |
| 5,100,100 | 3/1992 | Benson | 251/129.06 |

FOREIGN PATENT DOCUMENTS

| | | | |
|---|---|---|---|
| 2134223 | 8/1984 | Japan | 251/129.06 |
| 0246667 | 11/1987 | Japan | 251/129.06 |
| 0112090 | 4/1989 | Japan | 251/129.06 |
| 1355823 | 11/1987 | U.S.S.R. | 251/129.06 |

*Primary Examiner*—Ira S. Lazarus
*Assistant Examiner*—Thomas M. Sember
*Attorney, Agent, or Firm*—Pearne, Gordon, McCoy & Granger

[57] ABSTRACT

This invention relates to a piezoelectric valve for controlling fluid flow and, more particularly to such a valve which is neither solenoid or servo assisted. In this specification and claims, reference to fluid(s) includes both liquid(s) and gas(es). One particular form of piezoelectric valve for controlling fluid flow comprises a housing, a cavity within the housing, piezoelectric valve disc element and a valve seat, inlet and outlet ducts for leading fluid into and out from the cavity and disposed on opposite sides of the valve disc element and means for supporting the valve disc element at a central region of the element with the peripheral region of the disc disposed for cooperation with the valve seat so that upon actuation of the element by a voltage applied thereto, the periphery of the disc is displaceable and at least a portion of a peripheral region of the disc serves to control fluid flow between the inlet and outlet ducts.

20 Claims, 3 Drawing Sheets

SYSTEM FOR CONTROLLING FLUID FLOW

BACKGROUND OF THE INVENTION

This invention relates to a valve for controlling fluid flow and, more particularly, to a piezoelectric valve which is neither solenoid or servo assisted. In this specification and claims, reference to fluid(s) includes both liquid(s) and gas(es).

A number of piezoelectric valves have been proposed embodying a valve element in the form of either a circular disc or a beam. The circular disc or beam element is usually a laminated structure having a piezoelectric ceramic wafer bonded to one or both major surfaces of a substrate having a different coefficient of expansion from the wafers. Alternatively, the valve element may comprise two oppositely polarised piezoelectric ceramic wafers of differing coefficients of expansion and bonded to each other in face to face relationship. Application of an electric field to the wafers causes the so constructed element to deflect in the same way as a bimetallic strip.

U.S. Pat. No. 4,545,561 describes and claims a piezoelectric valve for controlling fluid flow. The valve includes a split or two part housing between which parts a shallow and generally cylindrical cavity is formed. The split housing is divided along a parting plane which is parallel to opposite circular end planes of the cylindrical cavity. One part of the housing includes inlet and outlet fluid apertures for incoming and outgoing fluid whereas the other part of the housing contains first and second flexible electric contacts elements connectable to opposite terminals of a voltage source. A deformable conductive plate element is captured at its perimeter between the two parts of the split housing and has a piezoelectric wafer bonded on that side thereof opposite from the fluid apertures and in a position proximate to the center of the plate element such that the piezoelectric wafer is supported by the plate element without contacting the housing at its perimeter.

When assembled, the first flexible electric contact element is pressed into electrical contact with the piezoelectric wafer and the second flexible electric contact element is pressed against the deformable conductive plate element so that, upon actuation of the piezoelectric element by the voltage source, the plate element is caused to travel between a first position in which the plate element occludes the passage of fluid between at least one of the fluid apertures and the cavity and a second position in which the plate element is deformed away from at least one fluid aperture allowing fluid flow through the cavity between the inlet and outlet apertures.

It will, therefore, be appreciated that the valve described in U.S. Pat. No. 4,545,561 is an example of a circular disc type piezoelectric valve in which the disc is captured at its perimeter. On the other hand, a beam element, sometimes referred to as a bender element, type piezoelectric valve is described and claimed in PCT Application WO86/07429. The valve according to WO86/07429 comprises a housing defining a cavity, an inlet conduit means having one end terminating as an inlet orifice, said inlet orifice having a cross sectional area and being at a predetermined location and within said cavity and having another end of said inlet conduit means in fluid communication with a fluid supply;

an outlet conduit means having one end terminating as an outlet orifice at a predetermined location within said cavity and said outlet orifice having a predetermined cross sectional area, another end of said outlet conduit means in fluid communication with a means for using fluid from said fluid supply and having an effective fluid storage volume.

a bender element appropriately positioned within said cavity and affixed to said housing means, having a means adapted for providing signal communication between said bender element and a controllable flow control signal, said signal effective to cause said bender element to deflect a controlled amount thereby permitting an amount of said fluid to flow at a controlled flow rate through said valve device; and a first sealing means affixed to said bender element to effectively seal, during the absence of said flow control signal, said outlet orifice.

U.S. Pat. No. 3,360,664 describes an electromechanical transducer as opposed to a valve. The transducer includes a pair of spaced active components in the form of juxtaposed piezoelectric ceramic discs mounted to undergo flexure using a special hinge component when subject to acoustic energy. The active components may be in the form of perimetrally fixed discs or beams supported at their ends. FIG. 9 of U.S. Pat. No. 3,360,664 discloses a transducer in which an active vibrating piezoelectric element in the form of a disc is centrally fixed to a post (a node during flexure) whereas the ends of perimetral portions of the disc element form during flexural vibration anti-nodes. Upon excitation of the piezoelectric element, the degree of vibration of the anti-nodes is transmitted via connecting rods to a plate which is thereby displaced. Conversely, displacement of the plate by acoustic energy applied to the plate bands the piezoelectric element radially in a flexural node. Thus, the transducer disclosed in U.S. Pat. No. 3,360,644 is a device capable of transmitting and receiving wave energy under the agency of a piezoelectric element during flexure.

SUMMARY OF THE INVENTION

The valves and transducers hitherto proposed are, generally speaking, expensive to produce and in operation restrict the usable fluid flow rate to an unacceptable degree. It is an object of the present invention to produce a piezoelectric valve which can be fabricated in considerable numbers and possessing consistent lift and, consequently, fluid flow characteristics. The valves according to the present invention are eminently suitable for controlling the flow of gaseous media in, for example, appliances fuelled by town gas, bottled gas and liquefied petroleum gas. Such applicances include domestic, industrial and commercial burners for use in, for example, hot air and water heaters, boilers, refrigerators and cookers. The valves according to the present invention are also eminently suitable for remote control.

According to one aspect of the present invention, a valve for controlling fluid flow comprises a valve housing, a cavity within the housing, inlet and outlet ducts for leading fluid into and out from the cavity, a valve disc element made from an electro-strictive material and disposed in the cavity, and means for supporting the valve disc element at a position inwardly of the disc periphery so that upon actuation of the element by a voltage applied thereto. The periphery of the disc is displaceable and at least a portion of a peripheral region of the disc serves to control fluid flow between the inlet and outlet ducts.

The invention also includes a valve for controlling fluid flow, the valve comprising a housing, a cavity within the housing, a valve disc element made from an electrostrictive material and a valve seat, inlet and outlet ducts for leading fluid into and out from the cavity and disposed on opposite sides of the valve disc element and means for supporting the valve disc element at a central region of the element with the peripheral region of the disc disposed for cooperation with the valve seat so that upon actuation of the element by a voltage applied thereto. The periphery of the disc is displaceable and at least a portion of a peripheral region of the disc serves to control fluid flow between the inlet and outlet ducts.

Preferably, the disc is a circular piezoelectric disc element and the support is disposed concentrically with respect to the disc. Conveniently, the piezoelectric valve disc comprises a metal substrate having a piezoelectric layer bonded to at least one face thereof and the substrate extends outwardly beyond the (or each) piezoelectric layer to form a piezoelectric free peripheral boundary.

The substrate should have a suitable stiffness and possess a thermal expansion coefficient to match that of the piezoelectric material so as to extend the operating range of the device. Preferably the substrate is made from a metal having a low thermal expansion coefficient similar to that of the piezoelectric ceramic material such as an iron/nickel alloy, for example, INVAR (Registered Trade Mark) or NIL036.

BRIEF DESCRIPTION OF THE DRAWING FIGURES

The invention will now be described by way of example, with reference to the accompanying drawings in which.

DETAILED DESCRIPTION OF THE PREFERRED EMBODIMENTS

Figure 1:
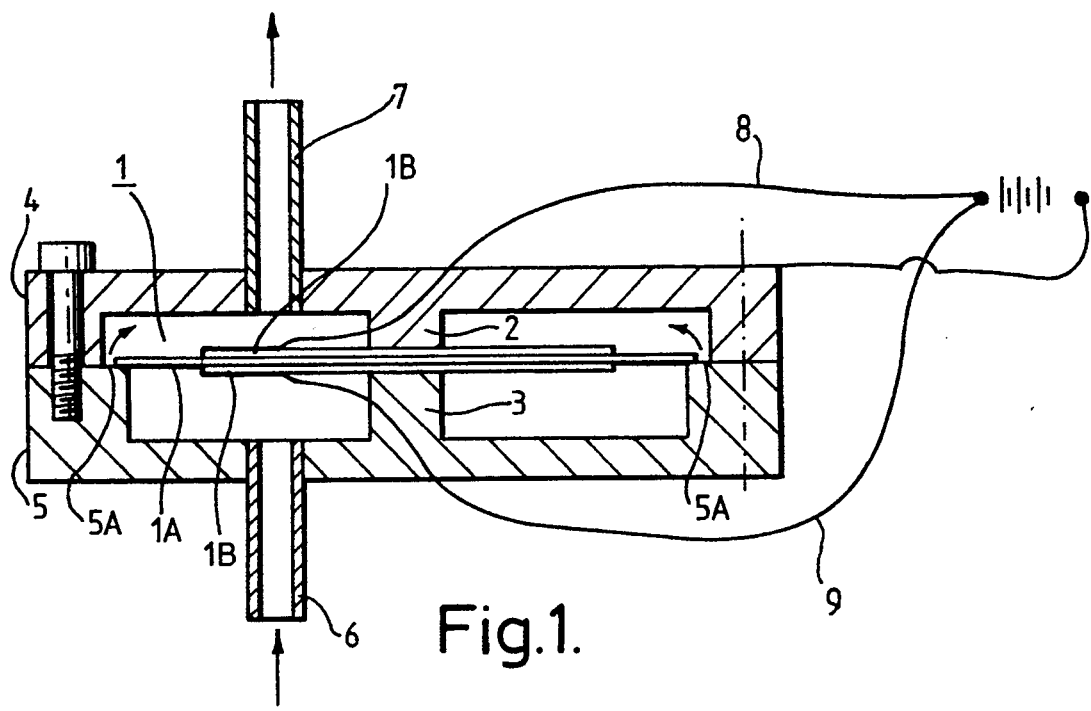
FIG. 1 is a cross-section of a first form of valve.

Referring to FIG. 1 a bimorph piezoelectric disc (1) having a substrate 1A in the form of a circular disc preferably made from an iron/nickel alloy which, for example, is sold under the tradename INVAR (Registered Trade Mark). The circular disc has a layer of piezoelectric ceramic 1B bonded to each major surface of the substrate 1A. The layers of piezoelectric ceramic 1B are also in the form of circular discs and they are positioned to leave a peripheral region of the substrate 1A which is not covered by the piezoelectric ceramic material of the layers 1B. The disc 1 is centrally clamped between two pillars 2 and 3 which are formed integrally with confronting parts 4 and 5 of a valve housing. An inlet 6 and serves to lead fluid to the valve and an outlet 7 serves to lead fluid from the valve. Parts 4 and 5 of the housing may be locked together by screws or similar fixing elements. From FIG. 1 it will be seen that the valve housing 5 affords an annular seating step 5A and in FIG. 1, the valve is shown in a "closed" position. By applying a voltage across the faces of the disc via conductors 8 and 9 across the faces of the disc, the disc is caused to move upwards and away from the seating step 5A according to the polarity and magnitude of the voltage thus decreasing and increasing the effective flow area exposed between the disc 1 and the seating step 5A. The externally applied electrical field to the layers 1B of piezoelectric ceramic material is parallel to the permanent polarisation within the piezoelectric ceramic material. In use, flow of fluid through the valve is analogue in that flow is approximately proportional to the flow area when the valve is open.

Figure 2:
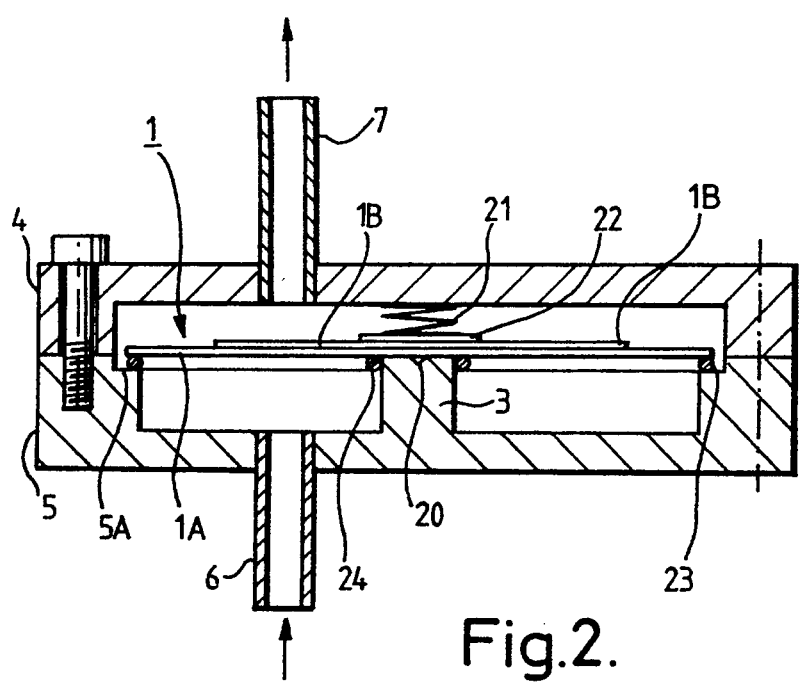
FIG. 2 is a cross-section of a second form of valve.
Figure 5:
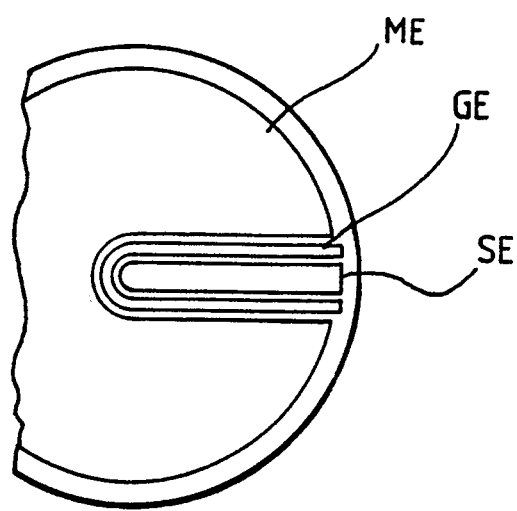
FIG. 5 shows an electrode configuration.

Referring to FIG. 5 it will be seen that incorporated in one of the piezoelectric elements of the bimorph of FIG. 1 or, to the single ceramic layer 1B of the disc 1A of FIG. 2, is a separate sense electrode (SE), without direct electrical contact with a main electrode (ME) and optionally further isolated from capacitive electrical coupling and/or indirect piezoelectric coupling from the main electrode (ME) by a guard electrode (GE) held at zero electrical potential. As the piezoelectric device flexes, a voltage is generated by the sense electrode (SE), which is proportional to the actual displacement of the device. This provides a mechanism for closed loop control of the piezoelectric element as a whole by monitoring voltage of the sense electrode (SE).

The device can operate in a number of different modes. By applying a d.c. voltage across the piezoelectric device, the disc can be deflected through a distance which is proportional to the voltage applied. The distance moved by the disc determines the effective flow area exposed. Feed back from the sense electrode can be used to control the actual displacement. Alternatively, an a.c. voltage may be applied to the piezoelectric disc causing it to oscillate. The effective flow area of the valve can then be controlled by varying the amplitude of the oscillations. In yet a further operational mode the piezoelectric disc (1) can be driven by a square wave from voltage (pulses) and the average effective flow area controlled by varying the width of the pulses. Thus over a period of time the average flow through the valve can be varied.

An alternative valve configuration is shown in FIG. 2 where as in FIG. 1 the centre of the disc (1) is constrained and the periphery is free to move. In FIG. 2, like reference numbers have been used for the same components as in FIG. 1. One advantage of the valves of FIGS. 1 and 2 as opposed to a valve where the centre of the disc 1 is free and the periphery is constrained (see U.S. Pat. No. 4,545,561) is that in the former configuration a much larger flow area is available and thus higher flow rates can be achieved.

In the valve configuration shown in FIG. 3 the disc 1 has a layer of piezoelectric ceramic 1B applied to one surface only (the upper surface) of the substrate 1A. Further, the disc is centralised on pillar 3 by means of a small projection and recess generally designated (20). Although in FIG. 3 the recess is shown in the upper surface of the pillar 2, the construction may be reversed. In addition, and in order to maintain contact and centrality between the disc 1 and the pillar 2, a spring 21 is inserted between the lower face of the housing 4 and the disc 1. In order to preserve the integrity of the piezoelectric ceramic layer 1B, a disc of resilient material 22 is placed between the spring 21 and the ceramic layer 1B. If desired, and to assist location and assembly, the disc 21 may be formed with a recess to receive the spring or a spigot which extends into the spring.

Where it is desirable to avoid use of the projection/recess (20) arrangement and thereby avoid additional fabrication steps when making the disc 1 or the pillar 2, an annular ring 24 may be affixed to the under surface of the substrate 1A in a position which is substantially concentric with the center of the substrate and the pillar 2.

To assist sealing of the valve when closed, an o-ring sealing ring (23) is supported on the annular sealing step 5A of part 5 of the housing.

For the device to act as a shut-off as well as a flow control mechanism, the flow orifice must be capable of being sealed. This can be achieved in a number of ways, such as, sealing ring (24). Another method for sealing valves is to have matching male and female forms on the two mating surfaces. Alternatively the mating surfaces can be made to conform, one to the other.

Figure 3A:
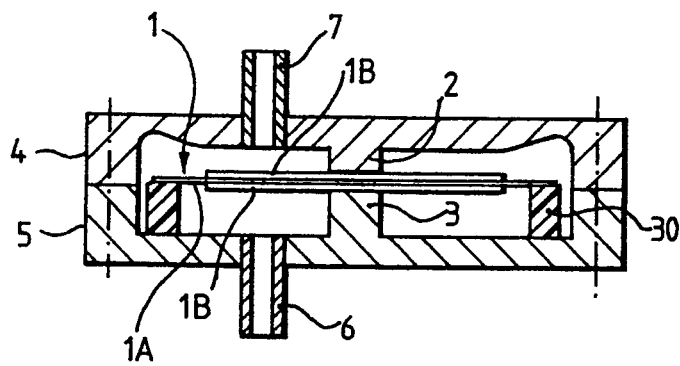
FIG. 3A, 3B and 3C are similar cross-sectioned views of a third form of valve in different functional attitudes.
Figure 3B:
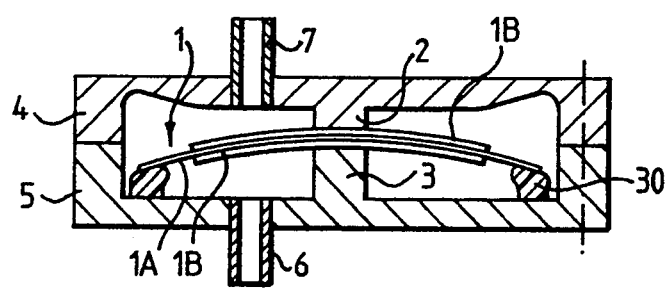
Figure 3C:
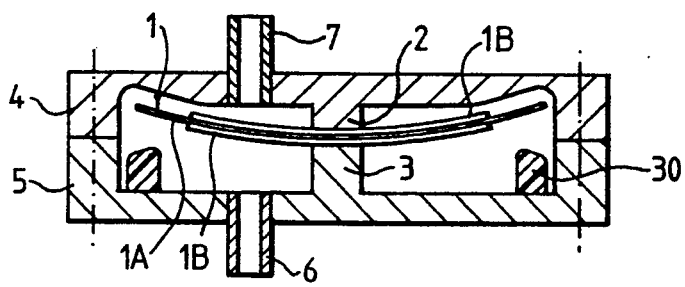
Figure 4:
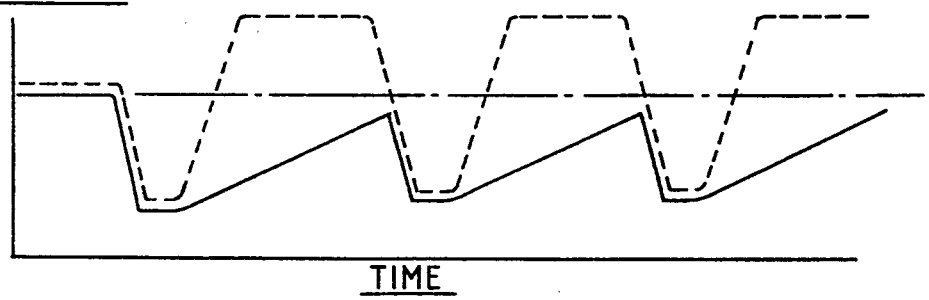
FIG. 4 is a valve displacement/time graph illustrating the different functional attitudes of the valve of FIGS. 3A, 3B and 3C.

Using a compliant seal in the piezoelectric valve in the conventional manner would not enable the valve to open, given the relatively small displacement of the disc compared with the compliance of the seal material. This is due to the fact that, conventionally, it is normal to use a sealing material having a significantly lower compliance than the valve structure, for example, a rubber seal. However, by using a seal material which is compliant but has a slow recovery rate after deflection it is possible to configure a piezoelectric valve with a compliant seal. One possible construction is shown in FIGS. 3A, 3B and 3C where like reference numbers have been used for the same components as in FIGS. 1 and 2. At rest, with the valve de-energised (FIG. 3A), a compliant elastomeric seal (30) recovers to seal against the piezoelectric disc (1A). To open the valve, the piezoelectric disc is first driven against the seal, causing the seal to deflect slightly (FIG. 3B). The voltage across the piezoelectric disc is then reversed, moving the disc 1A away from the seal surface, opening the valve and allowing fluid to flow (FIG. 3C). Before the seal recovers fully to seal the valve again, the disc 1A is once again driven against the seal (30) to deflect it. The graph in FIG. 4 shows the displacement of the seal and the disc 1A with time and indicates the effective valve open area. In FIG. 4 the full line represents seal (30) displacement and the dotted line represents piezoelectric disc 1A displacement. By varying the dynamic characteristics of the seal for any particular valve application a wide variety of flow regimes can be achieved. Varying the amplitude and frequency of the disc displacement provides variability of flow within any one application.

In a further enhancement, by selecting a suitable elastomer with the appropriate dynamic properties, it is possible to configure a system such that the frequency at which the disc 1A is pulsed is equal to half the reciprocal of the recovery time of the seal. By shifting the phase of the frequency of the disc 1A by 180° the seal and the disc are brought into antiphase and thus the effective flow area is increased compared to that of a non-tuned system. The actuation of the valve in this mode can be compared to bouncing a ball on the ground with a bat. The feed back signal from the sense electrode can be used to control the frequency and amplitude to ensure that the valve system remains tuned.

As mentioned previously, it is important to achieve stiffness matching between the substrate and the piezoelectric material to optimize performance. This is particularly important where the valve is to be used in a heated environment. We have found that there are two ways of achieving such stability, namely, the use of a thermally matched substrate and piezoelectric layer or the use of a symmetrical arrangement with identical piezoelectric layers 1B laminated to each major surface of the substrate 1A. Where a single sided disc is used, that is, where only one layer of piezoelectric material 1B is used, then the thermal expansivity of the metal substrate material should closely match the piezoelectric ceramic material. This can be achieved with a metal of very low thermal expansivity such as an iron/nickel alloy known commerically as INVAR or NIL036. In addition to the stiffness of layer 1B and, the substrate 1A should be carefully chosen such that the top surface of the piezoelectric ceramic layer is in compression when energized. The thickness of the INVAR substrate is preferably 0.2±0.1 mm and the thickness of the piezoelectric layer 1B is preferably 0.3±0.1 mm. Generally speaking the thinner the substrate 1A, the thinner the layer 1B when energised. Considered slightly differently, the thicknesses of the substrate and piezoelectric ceramic layout(s) are chosen so that the neutral axis of the disc does not coincide with an interface between adjacent layers. Such matching is important in order to eliminate tensile stress in the outer surface of the piezoelectric layer 1B. If the substrate is too stiff, the lift will be reduced. Similarly if the substrate is too weak the lift will also be reduced as the shape changes with the piezoelectric layer. It is also advantageous for the substrate to be a) non-ceramic, and b) passive so that in the event of a crack in the piezoelectric material, the valve will remain closed, and, in the event of power failure, the valve will also close. We have also found that it is beneficial to coat the piezoelectric layer 1B with a thin insulating layer or a conformal coating. Such a coating can increase the electric insulation relative to the surrounding areas thus allowing the maximization of the active area of the element. The use of a conformal coating is particularly important in cases where the piezoelectric layer 1B is extended to the peripheral edge of the substrate 1A without the risk of electrical arcing and thereby increasing the active area available within a given geometry.

We claim:

1. A shut-off and flow control valve for controlling fluid flow, the valve comprising a housing, a cavity within the housing, a valve disc element made from an electro-strictive material and a valve seat disposed within the cavity between an inlet and an outlet, the valve seat having a peripheral shape corresponding to a peripheral shape of the valve disc element, the valve disc element comprising a metal substrate having a piezoelectric layer bonded to at least one face thereof, the inlet and outlet leading fluid into and out from the cavity and being disposed on opposite sides of the valve disc element, and means for supporting the valve disc element at a central region of the element with the peripheral region of the disc disposed for cooperation with the valve seat so that, upon actuation of the valve disc element by a voltage applied thereto, the periphery of the disc is displaceable away from the valve seat to permit fluid to flow from the inlet over the periphery of the disc to the opposing outlet.

2. A valve according to claim 1 wherein the disc is circular and the support is disposed concentrically with respect to the disc.

3. A valve according to claim 1 wherein the metal substrate extends outwardly beyond the piezoelectric layer to form a piezoelectric free peripheral boundary.

4. A valve according to claim 1 including a main electrode and a sensing electrode isolated from the main electrode.

5. A valve according to claim 1 wherein the metal substrate is made from an iron/nickel alloy.

6. A valve according to claim 1 wherein the metal substrate is thermally matched relative to the layer of piezoelectric material.

7. A valve according to claim 1 wherein thicknesses of the respective layers of the piezoelectric valve disc are chosen such that a neutral axis of the disc is not coincident with an interface between adjacent layers.

8. A shut-off and flow control valve for controlling fluid flow, the valve comprising a housing, a cavity within the housing, a valve disc element made from an electro-strictive material and a valve seat disposed within the cavity between an inlet and an outlet, the valve seat having a peripheral shape corresponding to a peripheral shape of the valve disc element, the valve disc element comprising a metal substrate having a piezoelectric layer bonded to at least one face thereof, the inlet and outlet leading fluid into and out from the cavity and being disposed on opposite sides of the valve disc element, and means for supporting the valve disc element at a central region of the element with the peripheral region of the disc disposed for cooperation with the valve seat so that, upon actuation of the valve disc element by a voltage applied thereto, the periphery of the disc is displaceable away from the valve seat to permit fluid to flow from the inlet over the periphery of the disc to the opposing outlet, said metal substrate extending outwardly beyond the piezoelectric layer to form a piezoelectric free peripheral boundary, said piezoelectric free peripheral boundary sealing against the valve seat when the valve is closed.

9. A valve according to claim 8 including a feedback control means for controlling the opening displacement and hence modulating the fluid flow.

10. A valve according to claim 8 wherein the disc is circular and the support is disposed concentrically with respect to the disc.

11. A valve according to claim 8 including a main electrode and a sensing electrode isolated from the main electrode.

12. A valve according to claim 8 wherein thicknesses of the respective layers of the piezoelectric valve disc are chosen such that a neutral axis of the disc is not coincident with an interface between adjacent layers.

13. A valve according to claim 8 wherein the valve seat includes a compliant elastomeric seal.

14. A shut-off and flow control valve for controlling fluid flow, the valve comprising a housing, a cavity within the housing, a valve disc element made from an electro-strictive material and a valve seat disposed within the cavity between an inlet and an outlet, the valve seat having a peripheral shape corresponding to a peripheral shape of the valve disc element, the valve disc element comprising a metal substrate having a piezoelectric layer bonded to at least one face thereof, the inlet and outlet leading fluid into and out from the cavity and being disposed on opposite sides of the valve disc element, and means for supporting the valve disc element at a central region of the element with the peripheral region of the disc disposed for cooperation with the valve seat so that, upon actuation of the valve disc element by a voltage applied thereto, the periphery of the disc is displaceable away from the valve seat to permit fluid to flow from the inlet over the periphery of the disc to the opposing outlet, said valve seat including a compliant elastomeric seal.

15. A valve according to claim 14 wherein the disc is circular and the support is disposed concentrically with respect to the disc.

16. A valve according to claim 14 wherein the metal substrate extends outwardly beyond the piezoelectric layer to form a piezoelectric free peripheral boundary, said piezoelectric free boundary sealing against the valve seat when the valve is closed.

17. A valve according to claim 14 including a main electrode and a sensing electrode isolated from the main electrode.

18. A valve according to claim 14 including a feedback control means for controlling the opening displacement and hence modulating the fluid flow.

19. A valve according to claim 14 wherein the metal substrate is thermally matched relative to the layer of piezoelectric material.

20. A valve according to claim 14 wherein thicknesses of the respective layers of the piezoelectric valve disc are chosen such that a neutral axis of the disc is not coincident with an interface between adjacent layers.

* * * * *